United States Patent
Liu et al.

(10) Patent No.: US 11,295,096 B2
(45) Date of Patent: Apr. 5, 2022

(54) AUTOMATIC SEARCH METHOD FOR A STRUCTURAL MODE SIGNAL OF A CHIPLESS RFID TAG

(71) Applicant: South China University of Technology, Guangdong (CN)

(72) Inventors: Xiongying Liu, Guangzhou (CN); Nuanfeng Zhang, Guangzhou (CN); Tianhai Chang, Guangzhou (CN); Yi Fan, Guangzhou (CN); Yunjiong Qin, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 17/055,580

(22) PCT Filed: Nov. 5, 2018

(86) PCT No.: PCT/CN2018/113964
§ 371 (c)(1),
(2) Date: Apr. 29, 2021

(87) PCT Pub. No.: WO2019/218614
PCT Pub. Date: Nov. 21, 2019

(65) Prior Publication Data
US 2021/0248329 A1     Aug. 12, 2021

(30) Foreign Application Priority Data

May 15, 2018 (CN) .......................... 201810459650.0

(51) Int. Cl.
*H04Q 5/22* (2006.01)
*G06K 7/10* (2006.01)
(Continued)

(52) U.S. Cl.
CPC ....... *G06K 7/10158* (2013.01); *G06K 7/0095* (2013.01); *H04W 4/80* (2018.02)

(58) Field of Classification Search
CPC ............. G06K 7/10158; G06K 7/0095; G06K 7/10297; H04W 4/80
See application file for complete search history.

(56) References Cited

U.S. PATENT DOCUMENTS 4,477,770 A * 10/1984 Tojo .................... G01R 29/0814
                                                            324/613
6,539,062 B1 * 3/2003 Grabb ..................... H04L 27/02
                                                            375/261
(Continued)

FOREIGN PATENT DOCUMENTS

CN         101381042          3/2009
CN         103455776          12/2013
(Continued)

*Primary Examiner* — Munear T Akki
(74) *Attorney, Agent, or Firm* — JMB Davis Ben-David

(57) ABSTRACT

The proposed invention discloses an automatic search method for a structural mode signal of a chipless RFID tag. A reference plane, a target to be tested, a reader antenna and a reader are set in space. The target to be tested is located within the reading range of the reader antenna. The distance difference between the tag and the reference plane, to the antenna, is measured by using the phenomenon of the backscattered signals of the tag and the reference plane interfering in space, to obtain the distance between the tag and the antenna. The time period for extracting the antenna mode of the tag may maximize the use of the antenna mode signal, thereby enhancing the accuracy of reading the tag.

4 Claims, 4 Drawing Sheets

(51) Int. Cl.
    *G06K 7/00*    (2006.01)
    *H04W 4/80*    (2018.01)

(56) References Cited

U.S. PATENT DOCUMENTS

| | | | | |
|---|---|---|---|---|
| 7,269,395 B2* | 9/2007 | Choi | ................ | G06K 19/0723 |
| | | | | 455/115.3 |
| 7,804,915 B2* | 9/2010 | Huang | ................ | H04L 27/364 |
| | | | | 375/296 |
| 8,344,878 B2* | 1/2013 | Goldman | .............. | H04W 4/021 |
| | | | | 340/539.13 |
| 2005/0041533 A1* | 2/2005 | Fujisawa | ................ | G04C 3/14 |
| | | | | 368/47 |
| 2005/0232068 A1* | 10/2005 | Kubo | ....................... | G11C 8/12 |
| | | | | 365/233.5 |
| 2005/0242790 A1* | 11/2005 | Kofler | ................ | G06K 19/0723 |
| | | | | 323/234 |
| 2008/0080214 A1* | 4/2008 | Umeda | ................ | H02M 7/217 |
| | | | | 363/37 |
| 2010/0231293 A1* | 9/2010 | Cho | ........................ | H03D 1/06 |
| | | | | 329/347 |
| 2011/0316673 A1* | 12/2011 | Song | ................ | G06K 19/07771 |
| | | | | 340/10.1 |

FOREIGN PATENT DOCUMENTS

| | | |
|---|---|---|
| CN | 104507163 | 4/2015 |
| CN | 108710814 | 10/2018 |

\* cited by examiner

AUTOMATIC SEARCH METHOD FOR A STRUCTURAL MODE SIGNAL OF A CHIPLESS RFID TAG

CROSS-REFERENCE TO RELATED APPLICATIONS

This is the U.S. National Stage of International Patent Application No. PCT/CN2018/113964 filed on Nov. 5, 2018, which in turn claims the benefit of Chinese Patent Application No. CN 201810459650.0 filed on May 15, 2018.

TECHNICAL FIELD

The invention relates to the field of the Internet of Things, in particular to an automatic search method for a structural mode signal of chipless RFID tags.

TECHNICAL BACKGROUND

In recent years, chipless RFID technology has become a research hotspot. Due to the removal of integrated circuits, the cost of chipless RFID tags is effectively lowered. At the same time, the chipless RFID technology with its printable characteristics has the potential for large-scale application. Precise positioning is one of the advantages of RFID technology. By measuring distances between a tag and multiple signal receiving nodes, the space coordinates of the tag are calculated to determine its position.

At present, the accuracy of distance measuring methods by measuring time intervals is relatively high. There are three methods for measuring time intervals: one is to use time corresponding to a maximum value of an excitation signal as time position of the signal, and a distance between a tag and a reader is determined by measuring a time interval between a transmission and a return of the excitation signal; one is NFMPM (Narrow Frequency Matrix Pencil Method) which adopts a rectangular window function with a certain length to scan a received signal. After each scan, a Laplace transform is performed to obtain a complex signal in the frequency domain, and then a MPM (Matrix Pencil Method) is introduced for the signal to obtain the time interval; one is a distance measurement method based on the principle of interference, which uses the characteristics of interference to determine the phase difference caused by the distance between the excitation signal to a reference plane and the distance between the excitation signal and the tag, thereby determining the distance between the tag and the reader.

The main factors that affect the accuracy of distance measurement of chipless RFID tags are: noise, antenna-mode signals, and excitation signal waveforms. Among them, noise has impacts on various distance measurement methods. The antenna mode signals have a greater influence on the method of detecting maximum values and the interference distance measurement method. The excitation signal waveforms have a greater impact on the method of detecting maximum values and NFMPM.

The excitation signal waveforms depend on the reader, and the interference distance measurement method is not affected by the excitation signal waveforms. Therefore, the interference distance measurement method is more stable. The interference distance measurement method requires a use of a reference plane with a known position as a reference point. By using the reference plane, the interference distance measurement method does not require a calibration of a delay generated by the reader and an antenna. Therefore, the interference distance measurement method has advantages over other two distance measurement methods.

SUMMARY OF THE INVENTION

In order to address the drawbacks of the prior arts, the proposed invention provides an automatic search method for a structural mode signal of a chipless RFID tag.

The proposed invention adopts the following technical schemes:

An automatic search method for a structural mode signal of a chipless RFID tag includes the following steps:

S1 setting a reference plane, targets to be tested, a reader antenna and a reader in a space, wherein there are more than two targets to be tested, and the targets to be tested is located within a readable range of the reader antenna;

S2 the reader generates an ultra-wideband pulse signal, the ultra-wideband pulse signal is radiated from the reader antenna to the space; after the ultra-wideband pulse signal meets the targets to be tested and the reference plane, multiple reflected signals are generated respectively; the reader receives the multiple reflected signals to obtain a signal in the time domain, the reflected signals comprise structural mode signals and antenna mode signals;

S3 rough searching for structural mode signals of two tags to be tested starting from a time axis of the time domain signal, with a time of receiving the signal as a starting time, expanding a window function to a right to search with a search step of i; after each move, performing a Fast Fourier transform on signals within the window function to obtain a frequency domain signal; numbering in order frequencies corresponding to notches with a uniform spacing of the frequency domain signal, and performing a linear regression, obtaining a slope $a_1$ according to the linear regression, removing first m frequency points with largest deviations, n is an integer, corresponding sequence numbers of remaining frequency points remain unchanged, and a linear regression is performed again, and the first m points with largest deviations are removed again, and corresponding sequence numbers of remaining frequency points remain unchanged; repeating this k times, and linear regression k times, using a slope obtained from a last linear regression to calculate a distance difference $d_1$ of this search;

comparing distance differences obtained in last x search results, stopping the search if the distance differences are close;

S4 determining a length of a fine search window function, the frequency domain signal obtained in the last search in S3 is used as an envelope, the length T of the fine search window function is obtained according to a bandwidth of the envelope;

S5 searching the time domain signal time axis, searching a structural mode signal of a first reflection signal from left to right, specifically:

using the fine search window function obtained by S4 to retain a structural mode signal of a second reflected signal, a start position of a first fine search window is a position where the signal is first received; signals outside two fine search window functions are set to zero; the first fine search window function is moved to the right with a step of j; performing a Fast Fourier transform on the signal for each movement to obtain a frequency domain signal, numbering in order frequencies corresponding to obtained notches with a uniform spacing, and performing a linear regression, removing m frequency points with largest deviations, corresponding sequence numbers of remaining frequency points remain unchanged, and a linear regression is performed again, and the m points with largest deviations are removed again;

repeating this k times, and linear regression k times, using a slope $a_1$ obtained from a last linear regression to calculate a distance difference $d_1$; a time difference of the fine search window function is converted to a distance difference $d_t$ of the space, and the search stops as $|d_t-d_1|<p_1$, determining the structural mode signal of the first signal found;

S6 continue to search for structural mode signals of the remaining signals, using the fine search window function to retain the structural mode signal whose relative position is the second in the last fine search, at the same time another fine window starts using the position of the protected window as a starting position to move to the right with a step of j, performing a Fast Fourier transform on the signal for each movement to obtain a frequency domain signal, numbering in order frequency signals corresponding to obtain notches with a uniform spacing, and performing a linear regression, removing m frequency points with largest deviations, corresponding sequence numbers of remaining frequency points remain unchanged, and a linear regression is performed again;

repeating this k times, and linear regression k times, using a slope $a_r$ obtained from a last linear regression to calculate a distance difference $d_r$;

a time difference of the fine search window function is converted to a distance difference $d_t$ of the space, and the search stops as $|d_t-d_r|p_1$, determining the structural mode signal of the first signal found;

S7 repeating S6 and continuing to search for the structural mode signals of the remaining signals until the structural mode signals of all the reflected signals are found;

S8 calculating the distance from each tag to be tested to the antenna.

The sequence numbers corresponding to adjacent notches in S3, S4, S5, and S6 have equal intervals, the sequence numbers and the frequencies corresponding to the notches are linearly regressed to obtain a slope a of a fitted line, the result of the distance difference is $$d = \left| \frac{c}{2an} \right|$$

where c represents the speed of light, n denotes the difference of the corresponding serial numbers of adjacent notches.

The length of the fine search window is determined according to the bandwidth of the envelope $$T = \frac{2}{BW}$$

where BW is the bandwidth of the frequency domain signal.

The distance difference in S5 and S6 is $$d_t = \frac{c|t_1 - t_2|}{2}$$

where c represents the speed of light, end time $t_1$ and $t_2$ of two fine search window functions are intervals.

When searching with the fine search window function, when the structural mode signals of the two labels are found, the result of the distance difference calculated by the distance difference formula will not be too large. When removing frequency points that deviate more, a small expansion of the search window function will not have a large impact on the calculation results, that is, when the results of several consecutive times are very close, it is determined that a structure mode signal is found.

Using an end time to of a rough search window function corresponding to an end of a rough search for the structure mode signal search as a center point, the end position of the fine search window function is selected in the interval $[t_0-\delta,t_0+\delta]$.

The window function in this specification is a rectangular window.

The beneficial effects of the proposed invention:

(1) The proposed invention provides a method for automatically searching for a structural mode signal based on the principle of electromagnetic wave interference, which improves the function of an interference distance measurement method;

(2) Using a linear regression method reduces the influence of a tag antenna mode signal on the accuracy of distance measurement;

(3) The window function searches from the left to the right on the time axis, which effectively reduces the influence of the tag antenna mode signal on the accuracy of distance measurement;

(4) Accurate positioning can be used to extract the time period of tag information, and to maximize the use of tag antenna mode signals to obtain better reading results.

DESCRIPTION

In the following, the proposed invention will be further described in detail with reference to embodiments and figures, but the implementation of the proposed invention is not limited thereto.

Embodiments

Figure 1:
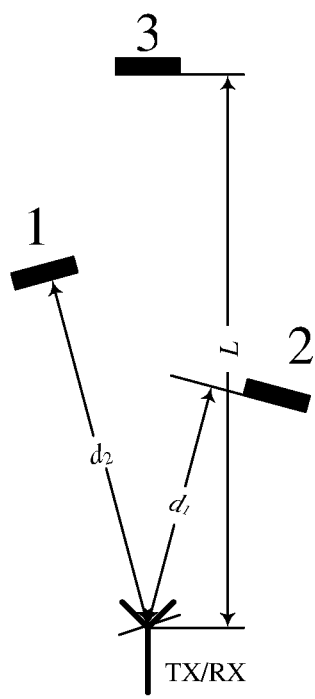
FIG. 1 is an illustrative diagram of a measurement structure used in the proposed invention.

As shown in FIG. 1 is an automatic search method for a structural mode signal of a chipless RFID tag. The hardware comprises a reference plane 3, targets to be d 1, 2, a reader antenna and a reader. There are more than two targets to be tested. The targets to be tested are within the read range of the reader antenna, and the distance between the reference plane and the reader is known to be L.

The targets to be tested are chipless RFID tags.

The reference plane is a plane formed by conductive materials used in a chipless RFID tag or conductive materials with similar properties.

The reader antenna is a broadband antenna, and specifically may be a horn antenna, a Vivaldi antenna, a log-periodic antenna etc.

The reader is a reader that may generate ultra-wideband pulse signals, receive ultra-wideband signals, and has certain signal processing capabilities.

Figure 2:
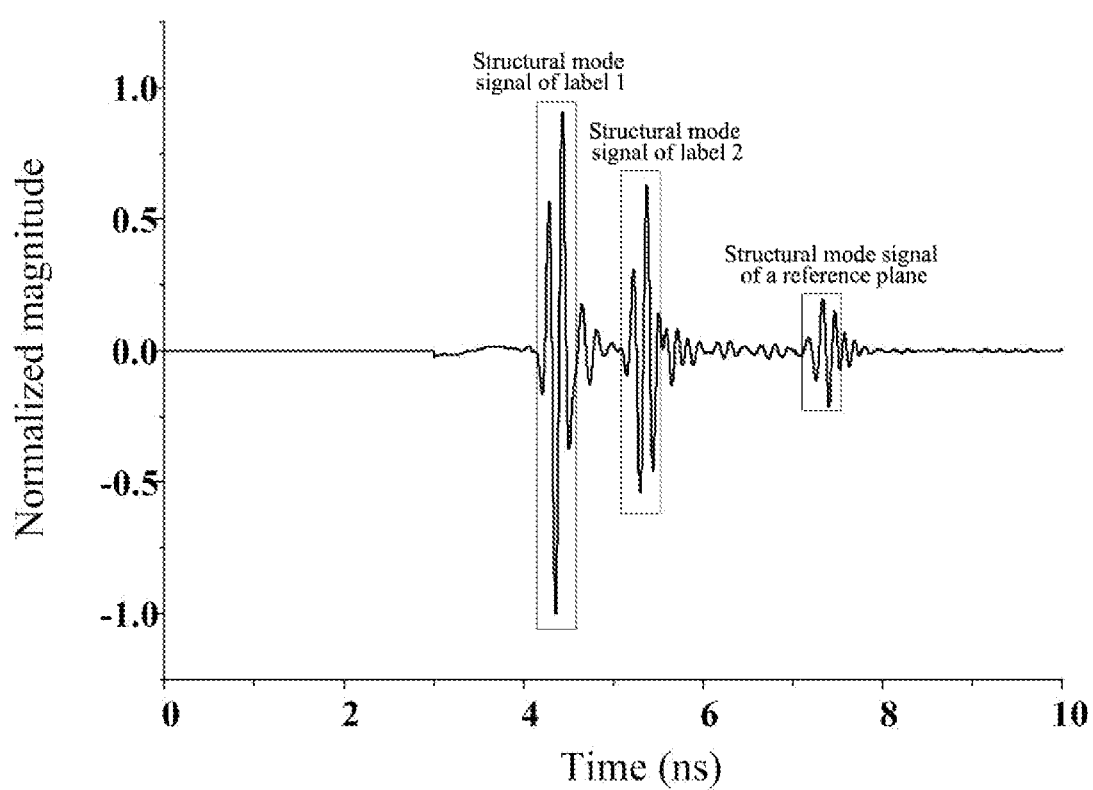
FIG. 2 is a simulation result of a normalized time-domain signal received by an antenna in an embodiment of the proposed invention, where a reference plane is located at (0, 750), tag 1 is located at (98.99, 299.23), tag 2 is located at (−70.59, 449.22); when the antenna is equivalently located near (0, −122.5)
Figure 3A:
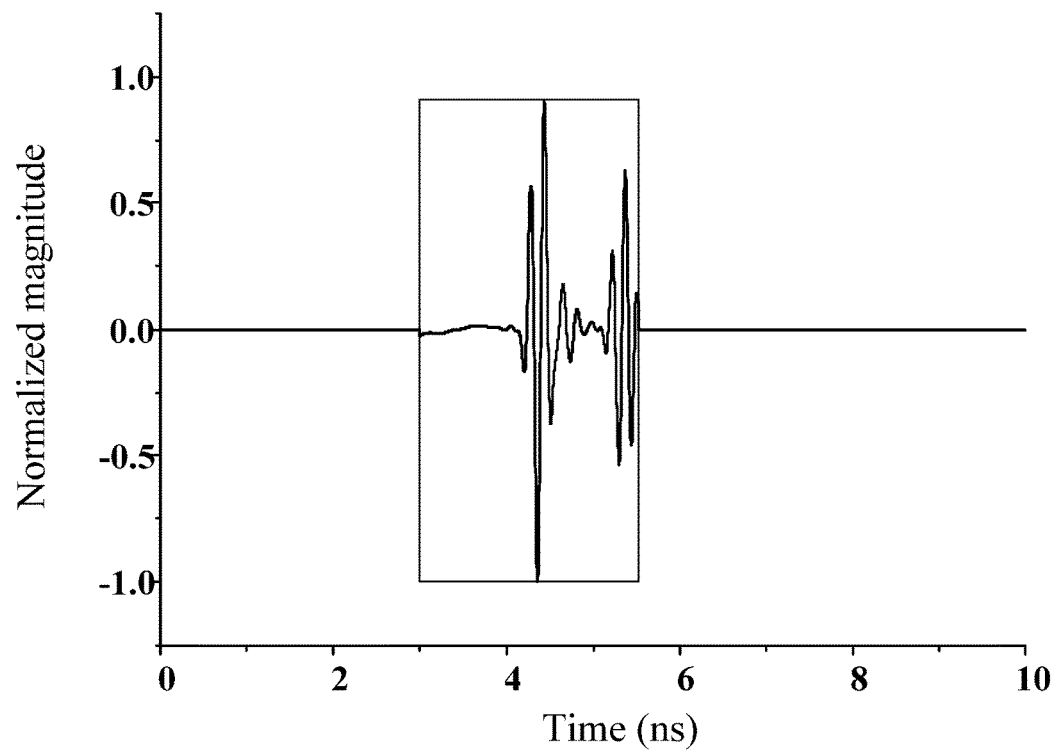
FIG. 3(a) is a time-domain signal retained by a rough search window function at the end of a rough search.
Figure 3B:
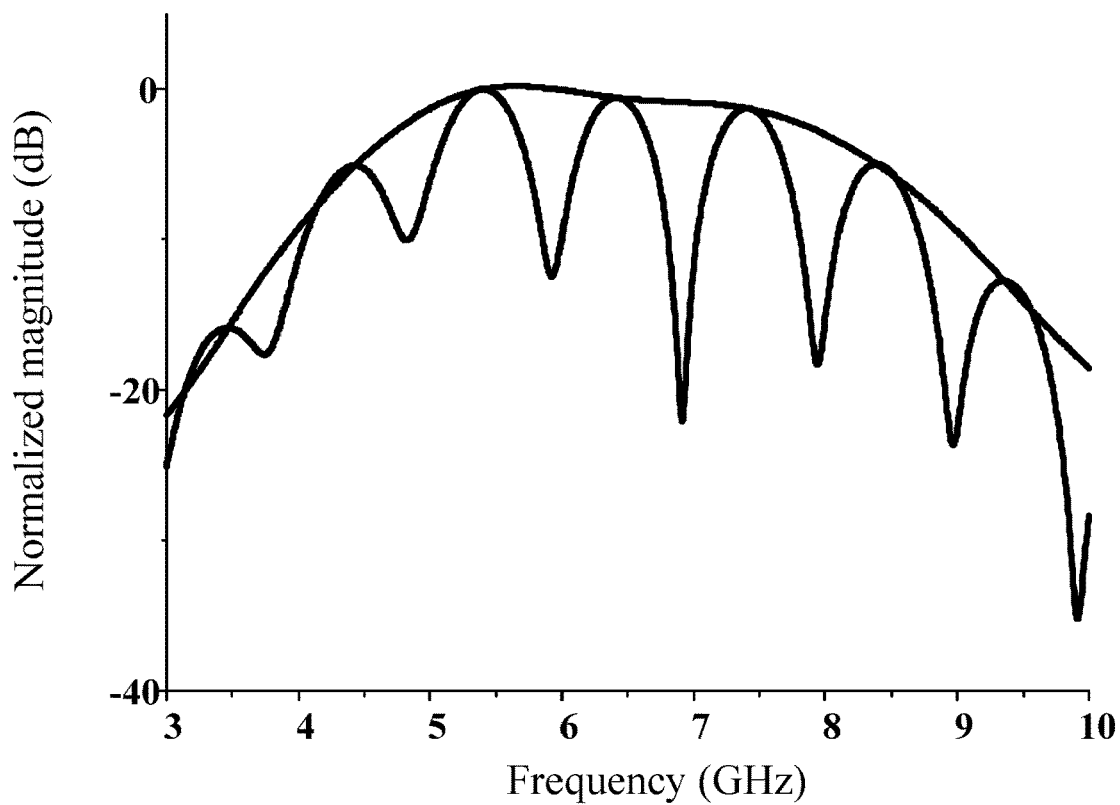
FIG. 3(b) is a result of normalization and envelope after a Fast Fourier transform of the time domain signal of FIG. 3(a)

As shown in FIG. 2, FIG. 3(a), and FIG. 3(b), the principle of the search method of a structural mode signal is:

This search method is based on an interference distance measurement method. The principle of the interference distance measurement method is: when two electromagnetic waves with the same frequency and the same polarization direction are opposite in phase at a certain point, the electromagnetic wave intensity at that point is equal to the absolute value of the intensity difference between the two electromagnetic waves, so the field intensity at this point is the smallest. The distance difference determines the phase difference, thus this feature can be used for distance measurement.

A time-domain signal of a chipless RFID tag may be divided into two parts: a structural mode signal and an antenna mode signal. The structural mode signal of the same chipless RFID tag is similar, but the antenna mode signal is not similar, which is determined by the structure of the tag. When the structure modes of the two tag signals are accurately extracted, the signals are Fourier transformed, and the spacing of the corresponding frequency domain signal notches is uniform. If a part of the antenna mode signals are mixed in, a part of the corresponding frequency domain signal notches is uneven. Since the frequency corresponding to a part of the notches is not affected by the antenna mode signal, a linear regression may still be used to obtain a more accurate distance difference.

When searching for the structural mode signals of the first and second signals, use a linear regression to obtain a fitted straight line. After removing some of the frequency points that deviate more, re-fitting is performed (may perform multiple re-fitting and removing frequency points), and finally obtain a slope of the fitted straight line. The slope is used to approximate the distance difference. After several consecutive searches, the distance difference deviation obtained is relatively small, and it is determined that the position of the structural mode signal of the second signal has been found. The length of the fine search window function is determined according to the bandwidth of the obtained frequency domain signal.

The fine search window function starts searching from an initial time and continues searching until the time position corresponding to a read range is exceeded. Because the fine search window function searches from left to right on the time axis, the signal first found by the fine search window function is a structural mode signal. When the distance difference obtained by a linear regression is close to the distance difference between the fine search window function, it is considered that the structural mode signal of the label has been found.

A specific search method in this embodiment comprises the following steps:

In this embodiment, the reference plane is a good conductor with a size of 40 mm×40 mm. The size of the chipless RFID tags is 40 mm×40 mm.

Since the time domain signal has been obtained, starting from step 3, in this embodiment, step i=0.01 ns, step 3 performs a linear regression for each search, and removes a frequency point with a larger deviation (more than one can be removed), and then performs a linear regression to obtain the distance difference. The distance differences obtained from four consecutive search results are compared, and stop searching when the distance difference is close. At the end of the search, the four consecutive results are 149.74 mm, 149.63 mm, 149.46 mm, and 149.46 mm. The differences between adjacent searches are small. The search is ended, and the end time of the previous second search window 5.53 ns when the search ends is selected as the end time of the rough search window.

Step 4. The frequency domain signal corresponding to the time domain signal retained by the rough search window function in step 3 is used as an envelope. In this embodiment, a 10 dB bandwidth is selected as the bandwidth of the pulse signal, BW=5.1 GHz, so T=0.3922 ns.

Figure 4A:
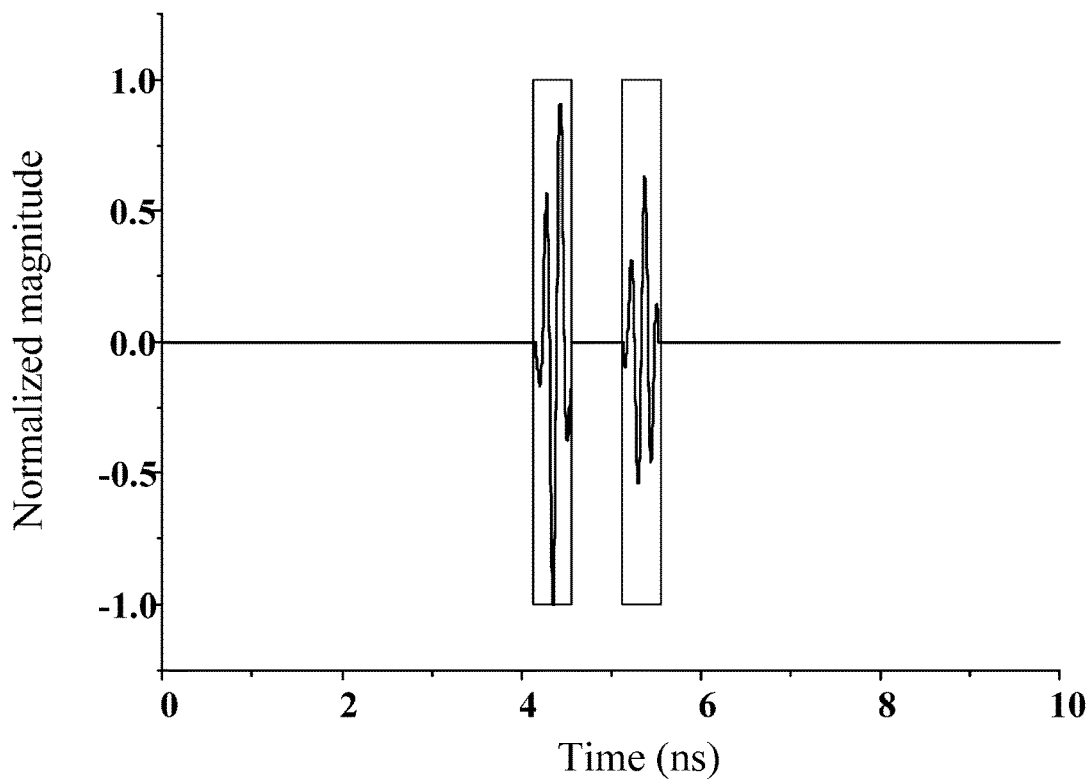
FIG. 4(a) is a time domain signal retained by two fine search window functions at the end of a first fine search.
Figure 4B:
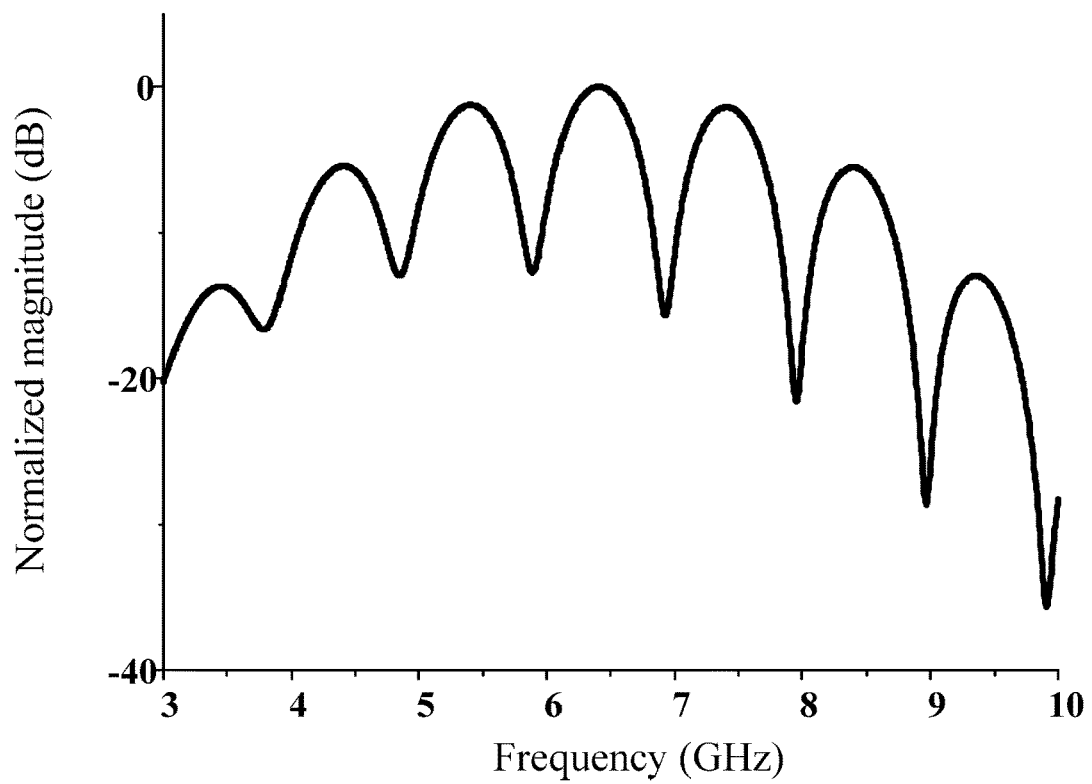
FIG. 4(b) is a result of the a Fourier transform and normalization of the time domain signal of FIG. 4(a)

Step 5. In this embodiment, the step j=0.01 ns, $p_1$=0.5 mm, a linear regression is performed for each search, and a frequency point with a larger deviation is removed (multiple points can be removed), and then a linear regression is performed to obtain the distance difference. When the search is stopped, the time domain signal obtained is shown in FIG. 4(a), and the corresponding frequency domain signal is shown in FIG. 4(b). The time difference between the fine search window functions is 5.53−4.56=0.98 ns, and the converted distance difference in space is 145.55 mm. The distance difference obtained based on the interference principle is 145.75 mm.

Figure 5A:
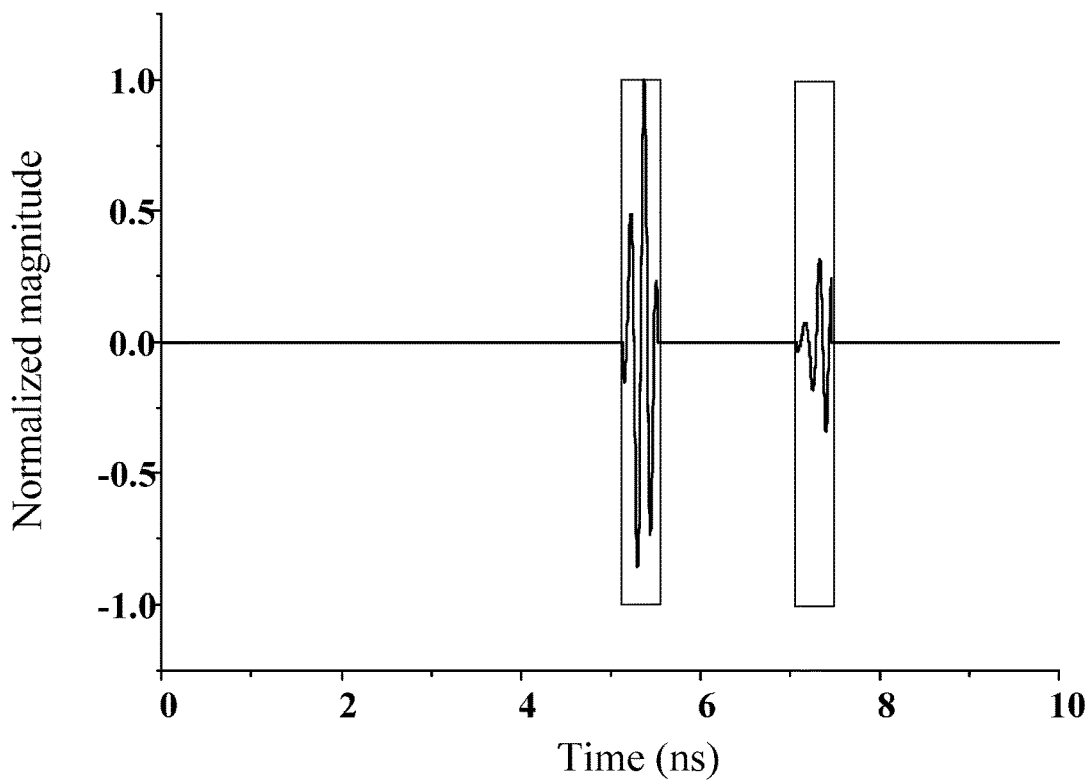
FIG. 5(a) is a time domain signal retained by two fine search window functions at the end of a second fine search.
Figure 5B:
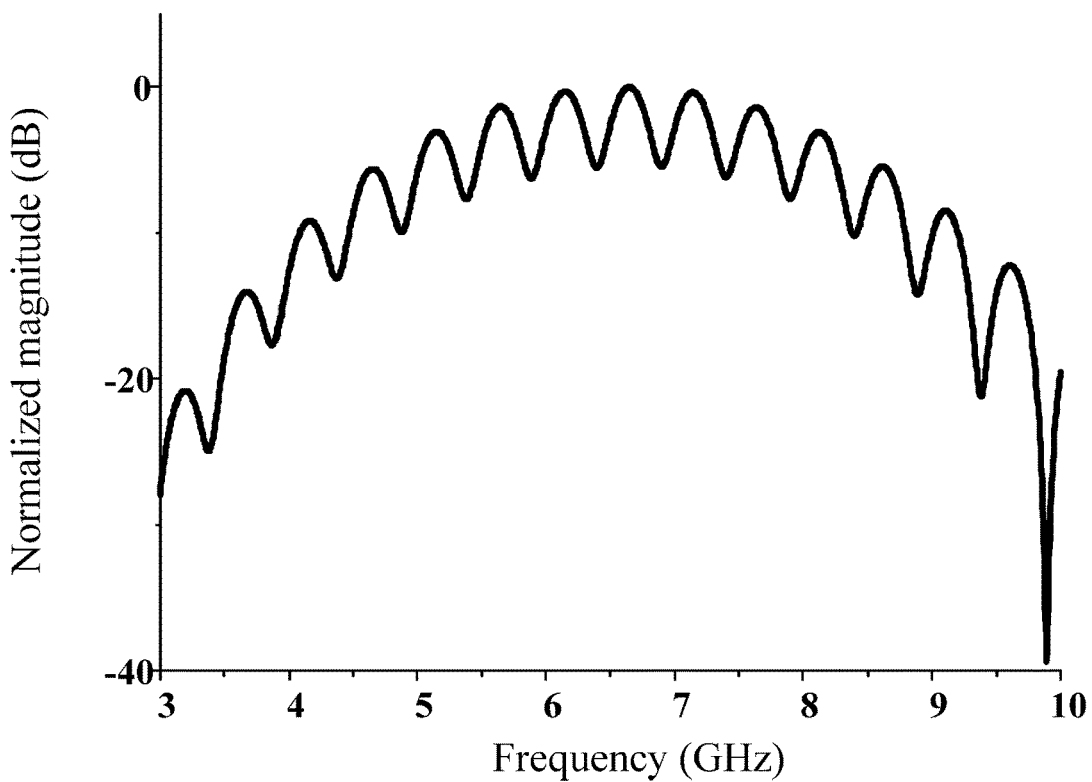
FIG. 5(b) is a result of a Fast Fourier transform and normalization of the time domain signal of FIG. 5(a).

Step 6. In this embodiment, the step j=0.01 ns, $p_2$=0.5 mm, a linear regression is performed for each search, and two frequency points with larger deviations are removed (multiple points can be removed), and then a linear regression is performed to obtain distance difference. When the search is stopped, the time domain signal obtained is shown in FIG. 5(a), and the corresponding frequency domain signal is shown in FIG. 5(b). The time difference between the fine search window functions is 7.54−5.53=2.01 ns, and the converted distance difference in space is 301.5 mm. The distance difference obtained based on the interference principle is 301.9 mm.

Step 7. The search range has been exceeded. The search ends.

Step 8. According to the search results, the calculation result $d_2'$=425.05 mm, $d_3'$=570.6 mm may be obtained. The true distance $d_2$=433.18 mm, $d_3$=576.06 mm.

The invention is based on an interference distance measurement method, and improves the function of the interference distance measurement method. By accurately locating the position of the structural mode signal, the accuracy of the interference distance measurement method may be improved, and at the same time, it is greatly helpful for detecting the antenna mode signal of a tag. Knowing exactly the time period of the antenna mode that may be adopted to extract the tag ID may maximize the usage of the antenna mode signal, thereby improving the accuracy of reading the tag ID.

The above-mentioned embodiments are preferred embodiments of the proposed invention, but the embodiments of the proposed invention are not limited by the embodiments. Any other changes, modifications, substitutions, simplifications and combinations made without departing from the spirit and principle of the proposed invention should be equivalent replacement methods, and they are all included in the protection scope of the proposed invention.

The invention claimed is:

1. An automatic search method for a structural mode signal of a chipless radio-frequency identification (RFID) tag, characterized in that, comprising the following steps:

Step 1: setting a reference plane, targets to be tested, a reader antenna and a reader in a space, wherein there are more than two targets to be tested, and the targets to be tested is located within a readable range of the reader antenna;

Step 2: the reader generates an ultra-wideband pulse signal, the ultra-wideband pulse signal is radiated from the reader antenna to the space; after the ultra-wideband pulse signal meets the targets to be tested and the reference plane, multiple reflected signals are generated respectively; the reader receives the multiple reflected signals to obtain a time-domain signal, the reflected signals comprises structural mode signals and antenna mode signals;

Step 3: rough searching for structural mode signals of two tags to be tested starting from a time axis of the time domain signal, with a time of receiving the signal as a starting time, expanding a window function to a right to search with a search step i; after each move, performing a Fast Fourier transform on signals within the window function to obtain a frequency domain signal; numbering in order frequencies corresponding to notches with a uniform spacing of the frequency domain signal, and performing a linear regression, obtaining a slope $a_1$ according to the linear regression, removing first m frequency points with largest deviations, n is an integer, corresponding sequence numbers of remaining frequency points remain unchanged, and a linear regression is performed again, and the first m points with largest deviations are removed again, and corresponding sequence numbers of remaining frequency points remain unchanged;

repeating this k times, and linear regression k times, using a slope obtained from a last linear regression to calculate a distance difference $d_1$ of this search;

comparing distance differences obtained in last x search results, stopping the search if the distance differences are close;

Step 4: determining a length of a fine search window function, the frequency domain signal obtained in the last search in S3 is used as an envelope, the length T of the fine search window function is obtained according to a bandwidth of the envelope;

Step 5: searching the time domain signal time axis, searching a structural mode signal of a first reflection signal from left to right, specifically:

using the fine search window function obtained by Step 4 to retain a structural mode signal of a second reflection signal, a start position of a first fine search window is a position where the signal is first received: signals outside two fine search window functions are set to zero; the first fine search window function is moved to the right with a step of j; performing a Fast Fourier transform on the signal for each movement to obtain a frequency domain signal, numbering in order frequencies to obtained notches with a uniform spacing, and performing a linear regression, removing m frequency points with largest deviations, corresponding sequence numbers of remaining frequency points remain unchanged, and a linear regression is performed again, and the m points with largest deviations are removed again;

repeating this k times, and linear regression k times, using a slope a1 obtained from a last linear regression to calculate a distance difference $d_1$;

a time difference of the fine search window function is converted to a distance difference $d_1$ of the space, and the search stops when $|d_r-d_1|<p_1$, determining the structural mode signal of the first signal found;

Step 6: continue to search for structural mode signals of the remaining signals, using the fine search window function to retain the structural mode signal whose relative position is second in the last fine search, at the same time another fine window starts using the position of the protected window as a starting position to move to the right with a step of j, performing a Fast Fourier Transform on the signal for each movement to obtain a frequency domain signal, numbering in order frequency signals corresponding to the obtained notches with a uniform spacing, and performing a linear regression, removing m frequency points with largest deviations, corresponding sequence numbers of remaining frequency points remain unchanged, and a linear regression is performed again;

repeating this k times, and linear regression k times, using a slope $a_r$ obtained from a last linear regression to calculate a distance difference $d_T$;

a time difference of the fine search window function is converted to a distance difference dt of the space, and the search stops when $|d_r-d_r|<p_1$, determining the structural mode signal of the first signal found;

Step 7: repeating Step 6 and continue to search for the structural mode signals of the remaining signals until the structural mode signals of all the reflected signals are found;

Step 8: calculating the distance from each tag to be tested to the antenna.

2. The automatic search method according to claim 1, characterized in that, the sequence numbers corresponding to adjacent notches in Step 3, Step 7, Step 5, and Step 6 have equal intervals, the sequence numbers and the frequencies corresponding to the notches are linearly regressed to obtain a slope a of a fitted line, the result of the distance difference is $$d = \left|\frac{c}{2an}\right|$$

where c represents the speed of light, n represents the difference of the corresponding serial numbers of adjacent notches.

3. The automatic search method according to claim 1, characterized in that, the length of the fine search window is determined according to the bandwidth of the envelope $$T = \frac{2}{BW}$$

where BW represents the bandwidth of the frequency domain signal.

4. The automatic search method according to claim 1, characterized in that, the distance difference in Step 5 and Step 6 is $$d_t = \frac{c|t_1 - t_2|}{2}$$

where c represents the speed of light, ending time $t_1$ and $t_2$ of two fine search window functions denote intervals.

* * * * *